United States Patent

Muntjanoff

[11] 4,113,124
[45] Sep. 12, 1978

[54] MOVABLE ARCH STRUCTURE FOR SKIDDER VEHICLE

[75] Inventor: John R. Muntjanoff, Aurora, Ill.

[73] Assignee: Caterpillar Tractor Co., Peoria, Ill.

[21] Appl. No.: 554,936

[22] Filed: Mar. 3, 1975

[51] Int. Cl.² ............................................. B66C 1/42
[52] U.S. Cl. .................................... 214/147 G; 214/92
[58] Field of Search ............ 214/130 R, 130 B, 131 R, 214/147 R, 147 T, 147 G, 1 BD, 92, 1 BV, 78, DIG. 10, 3.77 R; 212/8 R, 7; 144/34 A, 3 D

[56] References Cited

U.S. PATENT DOCUMENTS

| | | | |
|---|---|---|---|
| 1,843,968 | 2/1932 | Bellows | 214/DIG. 10 X |
| 2,337,109 | 12/1943 | Johnson | 214/672 |
| 2,349,352 | 5/1944 | Johnson | 214/DIG. 7 |
| 2,583,114 | 1/1952 | Monteith | 214/DIG. 10 X |
| 3,034,820 | 5/1962 | Schwartz et al. | 214/147 R X |
| 3,034,821 | 5/1962 | Hackett et al. | 214/147 G X |
| 3,211,065 | 10/1965 | Hunger et al. | 214/147 R X |
| 3,746,193 | 7/1973 | Eaves | 214/147 G X |
| 3,972,431 | 8/1976 | Fischer | 214/147 G |

Primary Examiner—Frank E. Werner
Attorney, Agent, or Firm—Phillips, Moore, Weissenberger, Lempio & Strabala

[57] ABSTRACT

A movable arch supporting a grapple unit at one end of a logging vehicle, the movable arch including a pair of links of different lengths being pivotably connected in spaced apart relation to a vehicle and a support beam, one end of the support beam extending rearwardly from the vehicle for connection with the grapple unit, a hydraulic jack being interconnected between the vehicle and one of the links.

6 Claims, 4 Drawing Figures

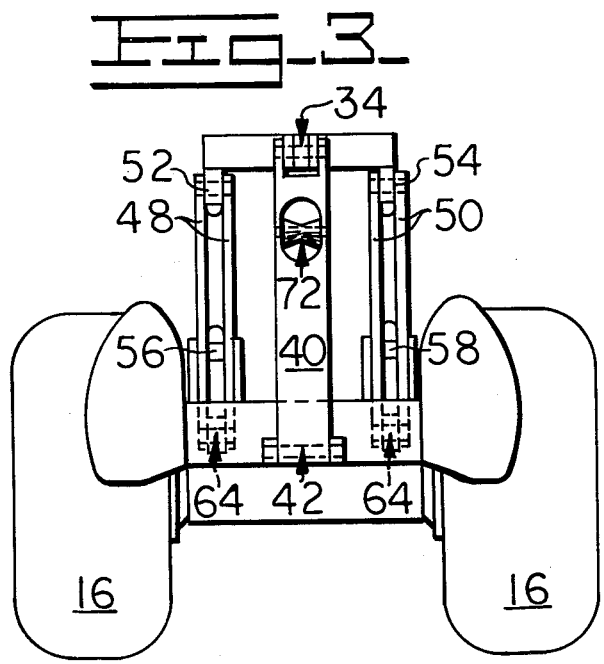
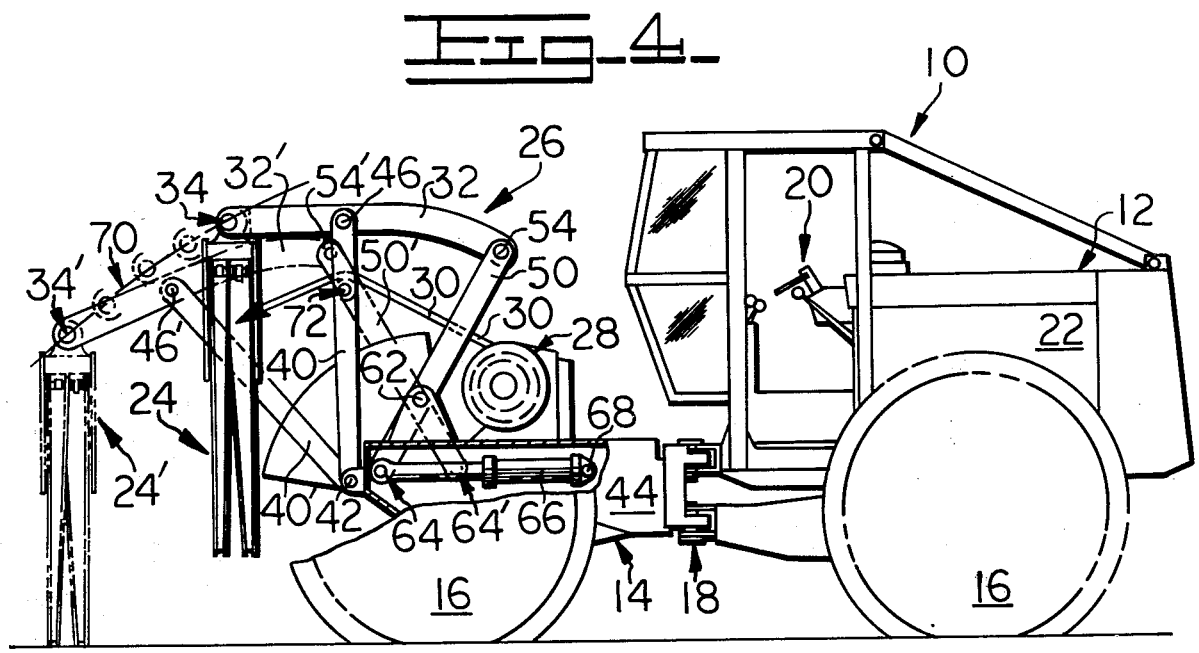

MOVABLE ARCH STRUCTURE FOR SKIDDER VEHICLE

BACKGROUND OF THE INVENTION

The present invention relates to a movable linkage for supporting a material handling implement upon a vehicle and more particularly to such a linkage embodied as a movable arch for supporting a grapple unit on one end of a vehicle.

The invention is described below with particular reference to a skidder vehicle of a type including one or more implements which adapt the vehicle for logging operations. In particular, such a skidder vehicle may include a movable arch for supporting a grapple unit at one end thereof. The grapple unit is operable to secure trees, logs, or the like which may then be towed by the vehicle.

A skidder vehicle of this type is commonly employed for conveying felled trees to a mill or other processing site. Also, where the trees are delimbed and cut into logs of selected length, the skidder vehicle may be employed to move a number of such logs at one time. In any event, the skidder vehicles operate under widely varying conditions and commonly encounter rough terrain. Accordingly, it is necessary to provide a rugged design for the skidder vehicle and all of its components. In addition, it is preferable to maintain a relatively low profile or center of gravity for the vehicle in order to enhance its operation over uneven terrain while carrying or towing heavy loads.

SUMMARY OF THE INVENTION

It is a particular object of the invention to provide a movable linkage embodied as a movable arch for use in such vehicles to facilitate their operation.

It is a more general object of the invention to provide such a movable linkage for adjustably supporting a material handling implement upon a vehicle.

More specifically, it is a particular object of the invention to provide a movable linkage including first and second links of different lengths being pivotably interconnected in spaced apart relation to structural portions of a vehicle and a support beam, one extended end of the beam being adapted for interconnection with an implement, motor means being effectively interconnected between the vehicle and one of the links whereby the one link acts as a lever through which the motor means is operable to position or control the implement.

It is an even more particular object of the invention to provide such a linkage embodied as a movable arch wherein the implement is a grapple unit and the link adjacent the grapple unit is relatively longer than the other link.

In order to provide a preferred path of movement for the grapple unit described immediately above, the longer, rearward link is pivotably connected to a relatively lower portion of the vehicle than the other link and a portion of the support beam is curved downwardly for a pivotable connection with the other link relative to its connection with the longer, rearward link.

Additional objects and advantages of the invention are made apparent in the following description having reference to the accompanying drawings.

DESCRIPTION OF THE DRAWINGS

FIG. 3 is a rearward view of the vehicle as seen from the left side of FIG. 1.

FIG. 4 is a view similar to FIG. 1 while illustrating a path of movement for a grapple unit upon the vehicle.

DESCRIPTION OF THE PREFERRED EMBODIMENT

Figure 1:
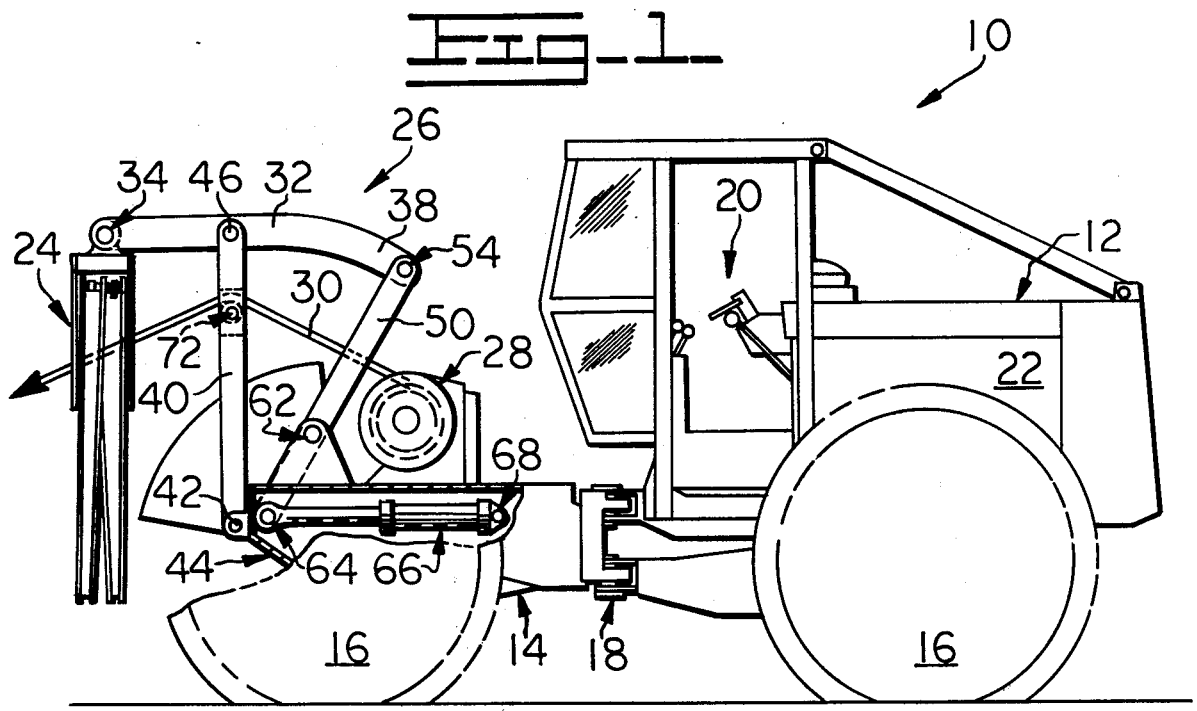
FIG. 1 is a side view in elevation of a log skidding vehicle including a grapple unit constructed according to the present invention.

The present invention is directed toward a movable linkage preferably embodied as an arch for supporting a grapple unit upon a log skidder vehicle of the type best seen in FIGS. 1 and 4. The movable arch constructed according to the present invention provides a preferred path of movement for the grapple unit under the influence of a linearly acting motor means. In particular, the movable arch illustrated within the drawings is preferably configured to provide for movement of the grapple unit along an elliptical path as seen from the side of the vehicle. This provides greater reach for the grapple unit while also maintaining a relatively low center of gravity for the vehicle when a load is raised and supported by the grapple unit. However, it will be obvious from the following description that such a linkage may also be used to advantage for mounting various implements upon a vehicle and providing for controlled movement of the implement along a generally elliptical path.

Referring now to FIG. 1, a log skidding vehicle indicated at 10 includes frame sections 12 and 14 each supported by ground wheels 16 and coupled together in articulated fashion along an axis indicated at 18. Preferably, an operator station 20 and a prime mover or engine 22 are arranged upon one of the frame sections, for example the forward section 12, while a grapple unit 24 is supported by means of a movable arch structure 26 arranged upon the other or rearward frame section 14.

The log skidding vehicle also preferably includes a winch unit generally indicated at 28, the winch unit having a line or cable 30 which may be trained over a portion of the arch structure 26 for engaging a load to be towed by the vehicle. For example, the winch unit 28 may be employed to draw logs or trees closer to the vehicle where they can be engaged by the grapple unit.

Details of the particular grapple unit construction illustrated at 24 are the subject of a copending patent application: GRAPPLE UNIT FOR LOGGING VEHICLES, filed Feb. 24, 1975, as application Ser. No. 552,381, now U.S. Pat. No. 3,972,431, having a common assignee with the present invention.

For purposes of the present invention, it is sufficient to recognize that the grapple unit 24 embodies a material handling implement which is movable under the regulation of a linkage embodied within the movable arch structure 26.

Figure 2:
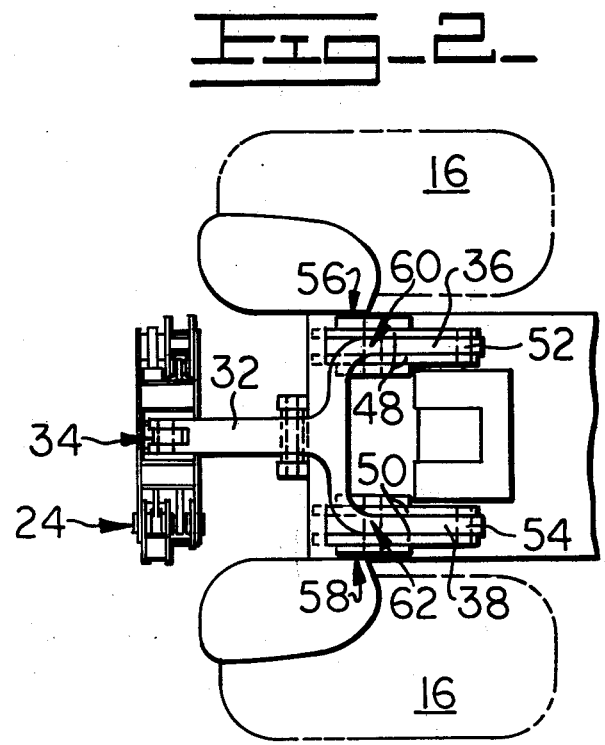
FIG. 2 is a fragmentary plan view of a rearward portion of the vehicle in FIG. 1.

Referring now particularly to FIG. 1, the arch structure 26 includes a support beam 32 having a biaxial pivot coupling 34 at its rearward end for supporting the grapple unit 24. The forward end of the support beam 32 is bifurcated and includes spaced-apart arms 36 and 38 as may be best seen in FIG. 2. The arch structure also includes forward and rearward links, the rearward link being indicated at 40 and extending upwardly from a pivotable connection 42 with a structural portion 44 toward another pivotable connection 46 arranged at a midportion of the support beam 32.

The forward link is formed by two bifurcated elements 48 and 50 coupled at one end with the arms 36 and 38 by means of pivot connections 52 and 54 respectively. The forward bifurcated link elements 36 and 38 are connected toward their other ends to brackets 56 and 58 secured to the structural portion 44 of the vehicle by means of pivot connections 60 and 62.

Within the present embodiment, the forward link elements 48 and 50 are selected to serve as levers through which movement of the grapple unit 24 is controlled. Accordingly, the bifurcated elements 48 and 50 extend downwardly past the pivot connections 60 and 62 for pivotable connection at 64 with similar hydraulic jacks 66. The hydraulic jack is also pivotably connected at 68 with the structural portion 44 of the vehicle. The effective length for the link 40 is thus defined by the distance between the pivot connections 42 and 46. Similarly, the effective length for the forward link element 50 is determined by the distance between the pivot connections 54 and 62. Spacing between the pivot connections 62 and 64 may be separately selected in order to determine the mechanical advantage for operation of the link elements 48 and 50 as levers.

Because of the different effective lengths for the forward and rearward links, it may be seen that their pivotable connection with the support beam 32 move along arcs of different radii. This is the basic feature of the present invention whereby the grapple unit 24 is caused to move along a horizontally arranged elliptical path as generally indicated at 70 in FIG. 4.

The path of the grapple unit in response to operation of the motor means 66 is also determined by the relative arrangement and spacing between the pivotable connections for the forward and rearward links with both the support beam and the vehicle. Referring to FIGS. 1 and 4, it may be seen that the pivot connections 60 and 62 are arranged forwardly and substantially higher than the pivot connection for the rearward link 40. In addition, the arms 36 and 38 which form the forward portion of the support beam 32 curve downwardly for engagement with the forward link elements 48 and 50 at the pivot connections 52 and 54. These particular features of the arch unit 26 further serve to define the path of movement for the grapple unit 24.

The various components of the arch structure 26 and the grapple unit 24 are illustrated in solid lines when they are shifted forwardly into a transport position as illustrated in both of FIGS. 1 and 4. However, in FIG. 4, those components are also illustrated in a rearwardly shifted position of a type suitable for engaging logs or fallen trees or the like. It may be further seen that the biaxial pivot coupling 34 follows the path of movement indicated at 70 as the arch structure and grapple unit are shifted between their forward and rearward positions. In addition, the various components of the arch structure and grapple unit are indicated by primed numerals in their rearward positions. In addition, it is noted that the rearward link 40 includes a rotatable sheave 72 over which the cable 30 is trained.

It is believed obvious that numerous modifications may be made within the scope of the present invention. Initially, as was also indicated above, the grapple unit 24 is merely one example of an implement which may be movably supported by a linkage embodied as the arch structure 26. In addition, it is further believed obvious that either of the forward or rearward links could be connected with the motor 66 to act as a lever through which movement of the grapple unit 24 or similar implement is controlled. For example, referring particularly to FIG. 4, the forward link elements 48 and 50 could be terminated at their pivot connections 60 and 62 with the pivot connection 64 being formed upon the rearward link 40 in substantially spaced apart relation above the pivot connection 42. With such an arrangement, it is obvious that the rear link 40 would then serve as a lever with the forward elements 48 and 50 serving in the simple function of control links. Finally, it is believed obvious that the bifurcated arms 36 and 38 for the support beam merely provide lateral stability within the arch structure and could be replaced by a single forward link element if lateral stability could be otherwise assured. Improved vehicle stability is also afforded by the relatively lower level linkage frame mountings and disposition of the hydraulic jack motor means. The integral frame attached rear linkage and jack support brackets not only contribute toward a lower center of gravity and improved visibility for the machine but also provide a protective enclosure for the actuating jacks. Accordingly, the scope of the present invention embodied for example in the log skidder vehicle described above is defined only by the following appended claims.

I claim:

1. A movable arch unit for adjustably supporting a grapple on one end of a vehicle, comprising:
    first and second links, each of said links being of a fixed length and being connected to structural portions of a vehicle in spaced apart relation along a longitudinal axis thereof,
    a non-linear support beam pivotably connected at spaced apart locations to the other ends of the links,
    an extended portion of the support beam including means for connection to the grapple, the link adjacent the extended end of the beam being the second and being substantially longer than the other first link, and
    an extendable and retractable motor means substantially enclosed by structural portions of the vehicle and being pivotably interconnected between one of the links and the vehicle,
    the one link interconnected with the motor means being pivoted at the one links connection to the structural portions of the vehicle between the support beam and the motor means so that the one link acts as a lever through which the motor means is operable to position the grapple.

2. The movable arch unit of claim 1 wherein the extendable and retractable motor means is pivotably interconnected between the first link and the vehicle.

3. The moveable arch unit of claim 2 wherein the link adjacent the extended end of the beam is the second link, said second link comprising a single element pivotably coupled at one end with the vehicle at a point substantially lower than the pivotable connection between the first link and the vehicle.

4. The movable arch unit of claim 3 wherein the support beam projects downwardly for pivotable engagement with the other link.

5. The movable arch unit of claim 4 wherein the motor means is a hydraulic jack.

6. The moveable arch unit of claim 2 wherein a portion of the support beam is bifurcated and the first link includes laterally separated link elements arranged for interconnection with bifurcated portions of the support beam in order to provide lateral stability for the arch unit and grapple; and the second link comprises a single element adjacent to the extended end of the beam and pivotably coupled at one end with the vehicle at a point substantially lower than the pivotable connection between the first link and the vehicle.

* * * * *